Sept. 19, 1944.  J. C. OWENS  2,358,472
TOILET FLUSHING TANK FLOAT
Filed April 28, 1943
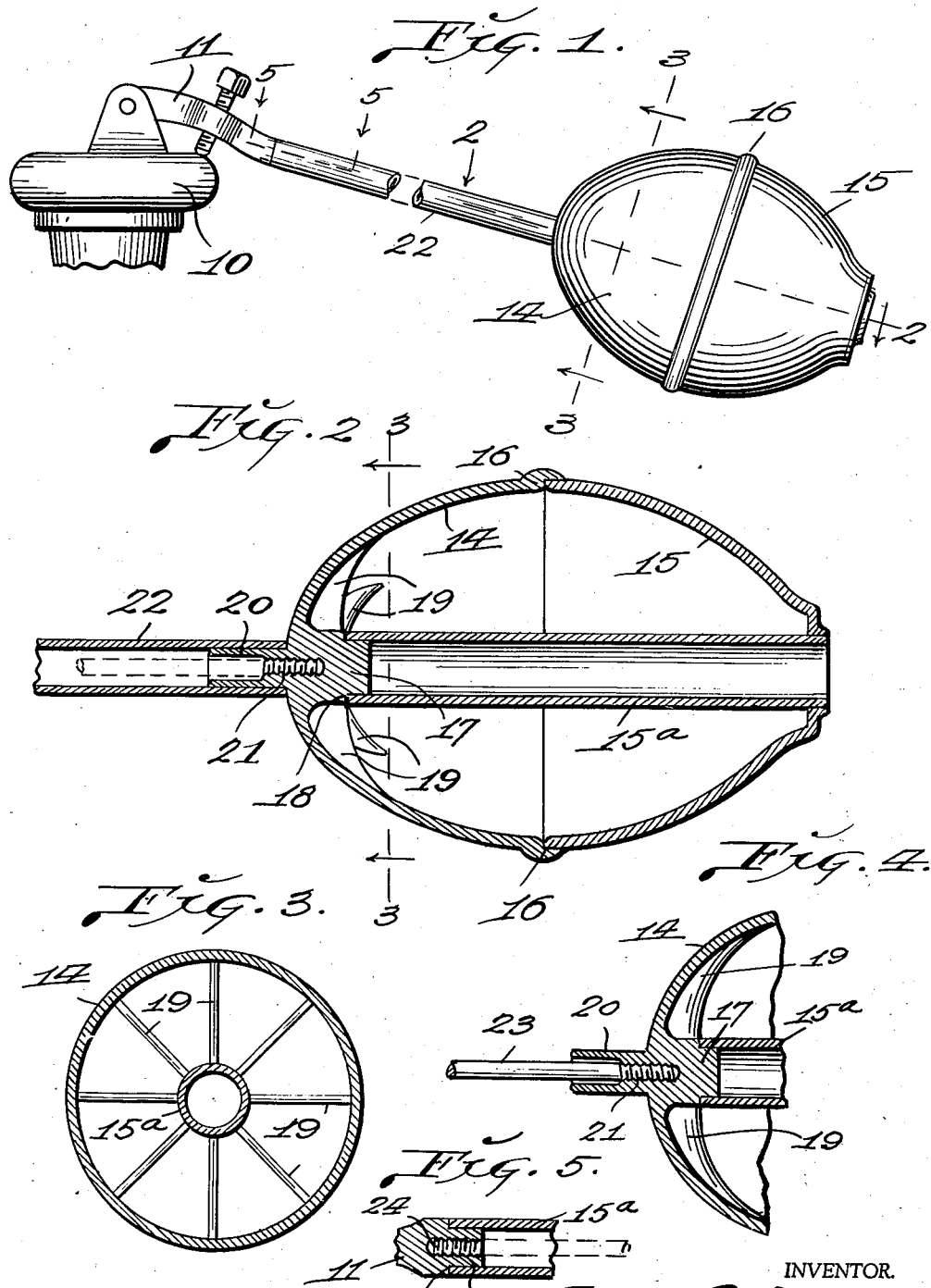
INVENTOR.
JESSE C. OWENS.
BY
Martin P. Smith, ATTY.

Patented Sept. 19, 1944

2,358,472

UNITED STATES PATENT OFFICE 2,358,472

TOILET FLUSHING TANK FLOAT

Jesse C. Owens, Los Angeles, Calif.

Application April 28, 1943, Serial No. 484,829

1 Claim. (Cl. 137—104)

My invention relates generally to toilet flushing tanks, and, more particularly, to the float which when lowered opens the ball cock to admit the water that refills the tank and bowl after the flushing function, and the principal object of my invention is to provide a simple, practical and inexpensive float composed wholly of plastic material, or the like, thus eliminating the use of metal in the production of the float and the arm that carries said float and is connected to the valve actuating lever.

A further object of my invention is to provide a toilet flushing tank float which may be readily applied to the metal rods which are connected to and project from the valve actuating levers of tanks now in service.

With the foregoing and other objects in view, my invention consists in certain novel features of construction and arrangements of parts which will be hereinafter more fully described and claimed, and illustrated in the accompanying drawing in which:

Fig. 1 is a side elevational view of a float constructed in accordance with my invention, and showing the same applied to the ball cock of a flushing tank.

Fig. 2 is an enlarged horizontal section taken on the line 2—2 of Fig. 1.

Fig. 3 is a cross section taken on the line 3—3 of Figs. 1 and 2.

Fig. 4 is a fragmentary section of the forward end of the float and showing the same applied to the metal rod which is connected to the valve actuating lever.

Fig. 5 is an enlarged section taken on the line 5—5 of Fig. 1.

Referring by numerals to the accompanying drawing which illustrates a preferred embodiment of my invention, 10 designates a conventional ball cock of the type used in toilet flushing tanks and 11 the valve actuating lever. Where this lever is constructed for use in connection with my improved float and arm, the outer end of said lever is reduced in diameter as designated by 12 in order to provide a circumferential shoulder 13.

The body of my improved float is preferably ellipsoidal in shape, and comprises parts 14 and 15 which are similar in shape and formed from suitable plastic material.

The edges of the body parts 14 and 15 are permanently united by means of a flanged joint 16, and the use of a suitable waterproof cement or acetone. Formed integral with the forward end of float member 14 on the interior thereof is a stud 17 provided with an externally arranged circumferential shoulder 18 and extending from said hub radially on the inside of said member 14 are integral ribs 19 which materially reenforce the forward portion of said member.

Seated in the outer end of float member 15 and permanently secured thereto by means of suitable cement or acetone is the open end of a tube 15a formed of plastic material and the opposite end thereof is mounted on the end of the stud 17 and bears against the shoulder 18 thereon. This end of the tube is permanently secured to the stud by means of a suitable cement or acetone. Formed integral with and projecting outwardly from the outer end of body member 14 is a tubular stud 20 and formed in the inner portion thereof and extending axially thereinto and into, stud 17 is a threaded bore 21.

Where my improved float is connected to lever 11 by a tube such as 22, the latter, formed from plastic material, has one end fitted onto tubular stud 20 and the opposite end is fitted onto the reduced end portion 12 of lever 11 with its end bearing against shoulder 13.

Where the float is connected to a metal rod or heavy wire, such as 23, and which rods are utilized on practically all toilet flush tanks now in general use, the threaded end of said rod 23 is screw seated in threaded bore 21 as illustrated in Fig. 4, and the opposite end of said rod is screw seated in the threaded bore 24 which is formed in the end of lever 11.

As illustrated in Figs. 2 and 4 the bore through stud 20 is larger in diameter than threaded bore 21, which structure enables the end of a float arm of plastics or the like, larger in diameter than a metal rod which might be screwed into threaded bore 21 to be inserted in said tubular stud 20.

Thus the float may be mounted on a metal rod, a slightly larger plastic rod, or a plastic tube.

Thus, my improved float may be applied to the metal rods utilized in flush tanks already installed, or in new installations, they may be connected to the valve actuating levers 11 by plastic tubes, such as 22. Tube 15a reenforces the body of the float in addition to reenforcing the joint 16 between the parts of the body and the radial ribs 19 reenforces that end of the float which is connected to the tubular arm 22, or the metal rod 23.

The production of the float and arm carrying the same from plastics affects a material saving of metal and further said float and arm are not subject to rust and corrosion.

Thus, it will be seen that I have provided a toilet tank flush valve float which is simple in construction, inexpensive of manufacture, and very effective in performing the functions for which it is intended.

It will be understood that various changes in the size, form and construction of the various parts of my improved float may be made and substituted for those herein shown and described without departing from the spirit of my invention, the scope of which is set forth in the appended claim.

I claim as my invention:

A flushing tank float comprising a hollow body, axially aligned internal and external studs formed on one end of said body, there being an opening formed in the opposite end of said hollow body, a separately formed axial tube disposed lengthwise within said body, one end of said tube being seated in said opening, the other end being seated on said internal stud, there being an axial bore formed in the outer portion of said external stud, and with a smaller threaded bore extending axially from the inner end of said first mentioned bore into said internal stud.

JESSE C. OWENS.